(12) United States Patent
Baldwin

(10) Patent No.: US 10,484,602 B2
(45) Date of Patent: Nov. 19, 2019

(54) CAMERA ARRANGEMENTS FOR WIDE-ANGLE IMAGING

(71) Applicant: Amazon Technologies, Inc., Reno, NV (US)

(72) Inventor: Leo B. Baldwin, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 163 days.

(21) Appl. No.: 15/638,790

(22) Filed: Jun. 30, 2017

(65) Prior Publication Data

US 2018/0027180 A1    Jan. 25, 2018

Related U.S. Application Data

(63) Continuation of application No. 13/621,827, filed on Sep. 17, 2012, now Pat. No. 9,699,379.

(51) Int. Cl.
*H04N 5/232* (2006.01)
*H04N 5/225* (2006.01)

(52) U.S. Cl.
CPC ....... *H04N 5/23238* (2013.01); *H04N 5/2258* (2013.01)

(58) Field of Classification Search
CPC .................................................. H04N 5/2258

USPC ........................................................... 348/38
See application file for complete search history.

(56) References Cited

U.S. PATENT DOCUMENTS

| | | | |
|---|---|---|---|
| 9,699,379 B1 | 7/2017 | Baldwin | |
| 2005/0025313 A1* | 2/2005 | Wachtel | G06T 1/0007 380/54 |
| 2008/0240613 A1 | 10/2008 | Dietz et al. | |
| 2011/0228043 A1* | 9/2011 | Masuda | H04N 13/221 348/36 |
| 2013/0121616 A1 | 5/2013 | Jin | |
| 2014/0028851 A1 | 1/2014 | Shan et al. | |

* cited by examiner

*Primary Examiner* — Yulin Sun
(74) *Attorney, Agent, or Firm* — Polsinelli LLP

(57) ABSTRACT

Approaches are described for constructing a single camera by combining an array (or other arrangement) of multiple smaller and lower resolution cameras. Each of the smaller cameras is aimed in a different direction in order to provide a wider angle and higher resolution field of view (FOV) for the resulting composite camera. Images captured by all of the cameras in the array can be stitched together using software to produce a single composite photograph. This construction method can enable the camera unit to be thinner and potentially cheaper in construction costs than an equivalent single-piece camera that has been conventionally implemented in portable devices.

19 Claims, 9 Drawing Sheets

CAMERA ARRANGEMENTS FOR WIDE-ANGLE IMAGING

CROSS-REFERENCE TO RELATED APPLICATIONS

This application is a continuation of U.S. patent application Ser. No. 13/621,827, filed Sep. 17, 2012, the content of which is incorporated herein by reference.

BACKGROUND

Digital cameras and photography have become an important part of everyday life for countless people. Digital cameras are being included in more and more devices and the quality of the images they capture is improving at a rapid pace. Aside from dedicated cameras, devices such as personal computers (PCs), mobile phones, tablet computers, laptops and electronic goggles are often equipped with some sort of image capturing apparatus. All of this technological integration presents ever more opportunities for utilizing imaging data for a variety of different purposes.

One interesting area of technology that has benefited significantly from digital cameras has been in the field of portable devices, such as tablet computers and mobile phones. Many phones and tablets today have multiple cameras integrated therein. For example, a smart phone often includes a rear-facing high resolution camera and a front-facing lower resolution camera. While such cameras have been getting smaller in size, they conventionally have significant size requirements when compared with other electronic components of the portable computing device. For example, the high resolution rear-facing camera may often be thicker than both the battery and the touch screen display. Many manufacturers have been seeking to make the camera thinner and cheaper, while still satisfying the resolution requirements expected by today's users.

BRIEF DESCRIPTION OF THE DRAWINGS

Various embodiments in accordance with the present disclosure will be described with reference to the drawings, in which.

DETAILED DESCRIPTION

Figure 1:
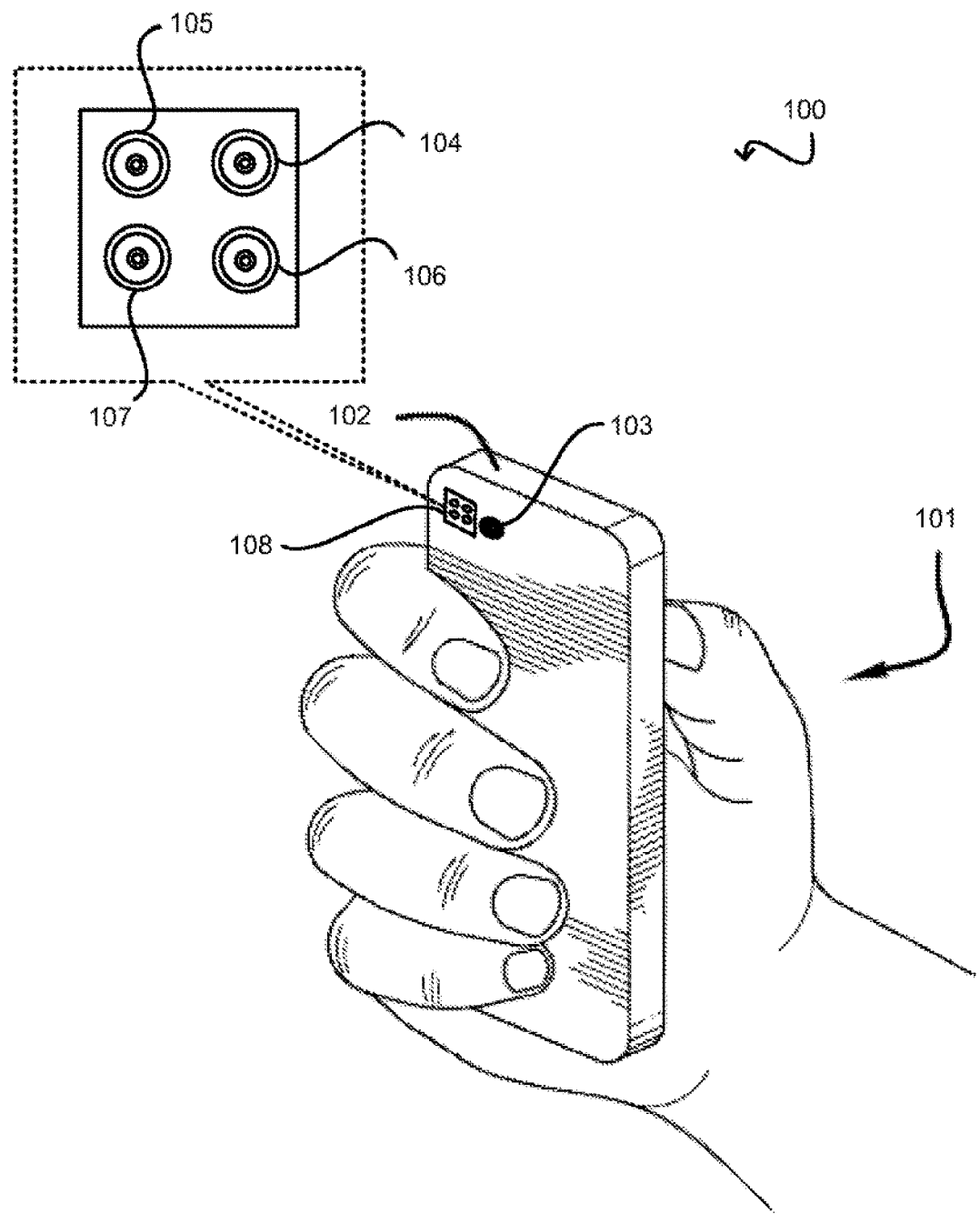
FIG. 1 illustrates an example of a mobile computing device having a composite camera embedded therein, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for providing image capturing components (e.g., cameras) in computing devices, such as mobile phones, tablet computers and the like. In particular, various embodiments provide approaches for constructing a single image capturing component by combining an array (or other arrangement) of multiple smaller and/or lower resolution cameras. Each of the smaller cameras may be aimed in a different direction in order to provide a wider angle and higher resolution field of view (FOV). Such a construction method can enable the resulting image capturing component to be thinner and potentially cheaper in construction costs than an equivalent single-piece camera that has been conventionally implemented in portable devices.

Conventionally, a rear-facing camera in a mobile device comprises a single large high-resolution sensor and a single large high-resolution wide-angle lens. For example, the sensor may be of the format ⅓' with 8 million pixels. The lens used with this sensor will typically have a focal length of about 4 mm and be comprised of 4 or 5 lens elements. For close focusing, this combination often requires the lens to be suspended and to have a focusing motor. Such a package would typically have dimensions of about 8.5 mm (length)× 8.5 mm (width)×6 mm (height).

A small and cheap camera (e.g., front-facing camera) conventionally has a format of ⅓' with 0.3 million pixels (VGA) or 0.7 million pixels (720p). The lens used with this sensor will typically have a focal length of 2 mm or less and be comprised of 2 elements. Due to the large depth of field of very small format cameras no focus mechanism is required. Such a package typically has dimensions of 2.5 mm×2.5 mm×3 mm. As such, compared to the monolithic rear-facing camera, the height of such a smaller camera is approximately one half (½) and the area is about one eleventh (1/11) of the rear-facing camera. This type of smaller camera is typically deployed as a forward facing camera, next to the display and is often embedded in a very thin bezel. Due to the ability to make the 2-element lens out of glass, this camera type has the additional advantage of being solderable. These cameras are sometimes referred to as CameraCubes (e.g., OVT OVM7692) or Wafer Scale Integrated cameras (WSI).

In accordance with various embodiments, an image capturing component (e.g., a composite camera) can be constructed by combining an array of multiple smaller and lower resolution cameras. Each smaller camera can be faced in a different direction from all other cameras in the array. In various embodiments, aiming a first camera in a different direction from a second camera means that the first camera has at least a portion of field of view that does not overlap with the second camera, thereby increasing the total field of view (FOV) covered by the combination of both cameras. In some embodiments, this can be achieved by tilting the cameras such that the optical axis of the first camera lens is not parallel with respect to the optical axis of the second camera lens. In other embodiments, the optical axes of the two lenses can be maintained parallel, however, the field of view can be increased by shifting the lenses in front of their respective imager, or by positioning the cameras with a predetermined distance between each other. Because the smaller cameras in the array are all aimed to face in different directions in this manner, the resulting field of view of the composite camera is higher than each of the smaller sub-cameras. For example, the array may be three by three (3×3) that includes a total of 9 cameras, with each camera having an FOV of about 25 degrees. In various embodiments, the cameras can be configured such that each camera's field of view overlaps the adjacent camera's field of view by a small amount (e.g., 10% or less).

In accordance with an embodiment, image stitching software can be used to combine the individual images captured by each of the cameras in the array into a single composite image. Given the example of the 3×3 array mentioned above, the composite image would have a field of view 60 degrees (diagonal) and a resolution about 8× one camera (e.g., in some cases not 9× due to FOV losses from the overlap regions). This example camera array would occupy an area of about 8.5×8.5 mm, similar to the conventional monolithic camera solution. Notably, the camera array would have a height of about 3 mm compared to the height of the monolithic camera at about 6 mm. This can be an important consideration as mobile products are driven to become ever thinner and the thickness of the camera becomes the gating item. As an additional benefit, the camera cubes can be directly soldered instead of being socketed or ACF attached. This simplified assembly can reduce cost of manufacturing the camera and hence the mobile device.

If 720p format camera cubes are used, the total resolution of the resulting composite camera would be about 5.5 million pixels (e.g., not 6.75 MP due to overlap pixels). Note that if a larger array of 4×4 cameras is used, the footprint can become about 10.5×10.5 mm but the height remains the same only 3 mm, leading to a thinner and more powerful device. For example, the resolution of the stitched image captured by using the 4×4 array would be about 10.5 MP (e.g., not 12 MP due to overlap losses).

Image stitching software can stitch together all or some of the images captured by the cameras in the array into a single composite image. As used throughout this disclosure, image stitching refers to the process of combining multiple photographic images with overlapping fields of view (FOV) to produce a seamless composite panorama or high-resolution image. The image stitching process is commonly performed by software and typically involves image registration, calibration and blending. Image registration includes matching the features in multiple images or otherwise aligning the images that contain overlapping scenes. Image calibration includes attempting to minimize the differences between an ideal lens model and the lens that was used to capture the image. Calibration also attempts to minimize optical defects and other imperfections in the image. Image blending includes executing the adjustments figured out in the calibration stage, combined with remapping of the images to an output projection. There are a number of image stitching software programs known in the art, and any one or more of these programs can be used to combine the images captured by the individual cameras of the array into a single composite image.

In various embodiments, image stitching software, image editing software or other program can be used to crop the resultant image to a simple rectangular boundary. As used throughout this disclosure, cropping refers to any process for removing any portion or portions of an image to produce a new version of the image that is of a predetermined shape or size. For example, if the image capturing component is configured to produce images of a specific aspect ratio (e.g., 8:5), the cropping process can remove the outer pixels of the composite image in order to produce a largest possible image having the specified aspect ratio. Similarly, to produce a panoramic format image, a crop can be made from the top and bottom of the composite image. As another example, an image can be cropped to fill a frame or to focus on a subject in the scene. Any number of image cropping or resizing techniques can be utilized in accordance with various embodiments.

In some embodiments, each of the individual camera cubes can be aimed in a different direction by arranging them onto a curved surface (e.g., approximately spherical) such that each camera's field of view (FOV) overlaps the adjacent cameras' fields of view by a small predetermined portion (e.g., approximately 10%). In other embodiments, the lens on some or all of the cameras is shifted so that each camera's FOV overlaps the adjacent FOVs by a small portion (e.g., about 10%). Lateral translation of the lens in this manner can produce a lens shift effect. For example, if a lens is laterally translated in front of an imager, the effect is the same as if the entire camera had been tilted in the direction that the lens was translated. This effect is called lens shift and is sometimes used in studio or architectural photography with either view cameras or special shift-lenses for SLR cameras. For lens shift to work, the lens must cover a larger area than the imager, so that there is still full coverage of the sensor after the shift. In various embodiments, laterally translating a lens includes moving the lens in a direction along the plane of the lens while maintaining the lens plane parallel relative to the image plane (in contrast to tilting the lens which involves rotating the lens plane relative to the image plane). For example, the lens can be translated in front of the imager by moving the lens several millimeters away from the center of the imager while maintaining the lens parallel to the imager (i.e. without tilting the lens).

In some embodiments, the fields of view of multiple cameras can be overlapped by a large predetermined portion (e.g., more than 50%) in order to achieve redundancy and to improve image resolution. In these embodiments, any given area of the image would be covered at least by two cameras, resulting in redundancy of image data for that area of the image. The redundant data can be used to improve the image resolution for the area of the image by utilizing any of a number of superresolution (SR) techniques known in the art. For example, multiple-frame SR can be used by taking multiple images of a particular scene (captured by the overlapping cameras) and fusing information from the multiple lower resolution images to create a higher resolution image, which is a better description of the scene.

FIG. 1 illustrates an example 100 of a mobile computing device having a composite camera embedded therein, in accordance with various embodiments. In the illustrated embodiment, the computing device is mobile phone 102 that is hand-held by a user 101. The mobile device 102 includes a rear-facing camera 108 that is comprised of a 2×2 array of 4 cameras (104, 105, 106, 107). The device may further include a flash device 103 for illuminating a scene in the field of view of the camera 108.

In accordance with an embodiment, the array of cameras (104, 105, 106, 107) are arranged in an array having two rows and two columns that include two cameras each. Each individual camera can be comprised of a lens and an image sensor that converts an optical image into an electronic signal. The cameras can be aimed in different directions while still having a small predetermined portion of field of view that overlaps between the adjacent cameras. For example, camera 104 can have an overlapping field of view with cameras 105 and 106 by approximately 10%. In that example, if each camera had a field of view of 20 degrees, than approximately 2 degrees of the FOV would overlap between the adjacent cameras. In an alternative embodiment, the overlapping field of view of cameras 105 and 106 can be more than 50% in order to ensure that any area of the scene is captured by two or more cameras. This can provided redundancy of data for each portion of the captured image. The redundancy can be used to enhance the resolution of the image as previously described.

It should be noted that although the example shown in this figure illustrates a 2×2 array, the various embodiments described herein are not limited to this particular array. Various alternative arrays or other arrangements of multiple cameras can be used within the scope of the embodiments described herein, as will be evident to one of ordinary skill in the art.

Figure 2A:
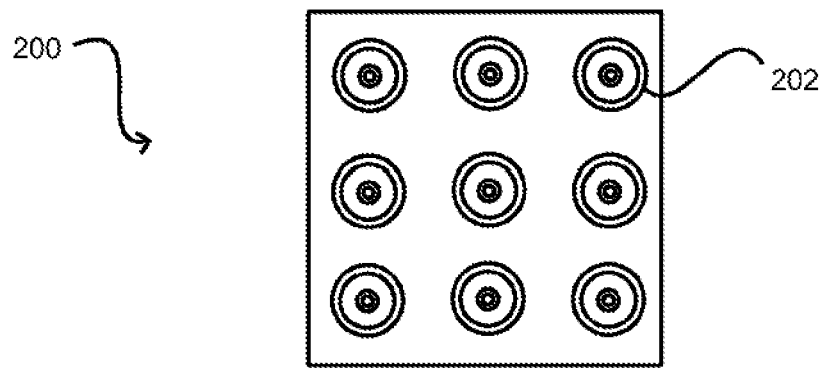
FIG. 2A illustrates an example of a 3×3 array that includes nine cameras arranged in 3 rows and 3 columns, in accordance with various embodiments.
Figure 2B:
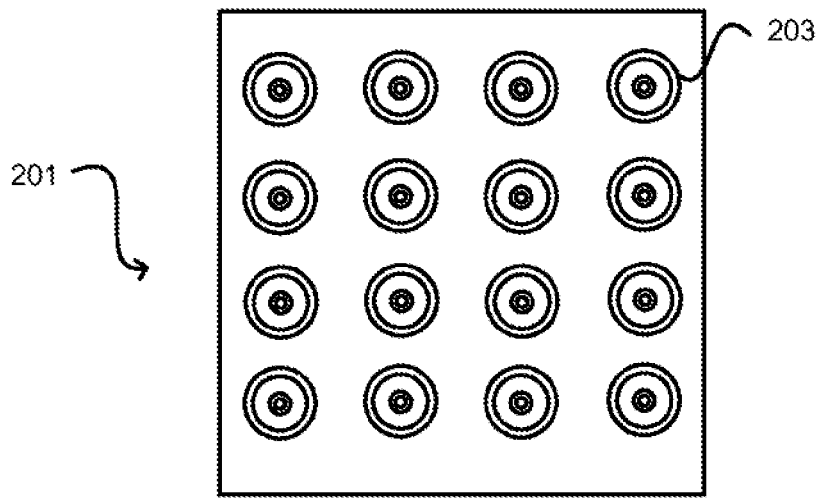
FIG. 2B illustrates an example of a 4×4 array that includes sixteen cameras arranged in 4 rows and 4 columns, in accordance with various embodiments.
Figure 2C:
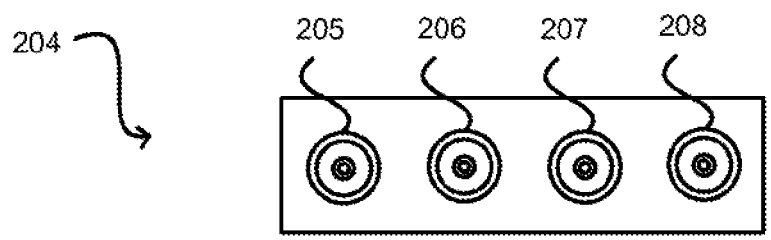
FIG. 2C illustrates an example of a single row of four cameras positioned adjacent to each other, in accordance with various embodiments.

FIGS. 2A, 2B and 2C illustrate several alternative examples (200, 201, 204) of camera arrangements that can be used in accordance with various embodiments. For example, FIG. 2A illustrates a 3×3 array that includes nine cameras arranged in 3 rows and 3 columns. FIG. 2B illustrates a 4×4 array that includes sixteen cameras arranged in 4 rows and 4 columns. FIG. 2C illustrates a single row of four cameras positioned adjacent to each other. Each of the four cameras may be aimed in a different direction such that a portion of the field of view overlaps by a small amount (e.g., 10%). For example, camera 205 can be aimed slightly in the "left" direction, camera 206 can be aimed slightly in the "up" direction, camera 207 can be aimed slightly in the "down" direction and camera 208 can be aimed slightly in the "right" direction. The precise angle of aiming the cameras can be configured according based on a number of factors, such as the size of the camera, lens properties and the like. Various embodiments described herein are not limited to any specific angle, direction or number of cameras. In addition, if the placement of the cameras introduces a slight perspective error due to the different location of each camera, this perspective error can be corrected using one or more image correction algorithms. As used throughout this disclosure, image correction should be broadly construed to mean any process to reduce or remove optical defects from an image or to otherwise enhance the quality of an image. Some examples of image correction include removing lens distortions (e.g., pincushion, fisheye, barrel distortions, etc.), noise reduction, using image histograms to improve picture brightness and contrast, changing color depth, changing contrast, red eye removal and the like. In various embodiments, image correction can be performed on each image captured by a camera of the array before combining all the images into the composite image, during the image stitching process, and/or after the composite image has been produced.

As previously mentioned, each camera (e.g., 202, 203, 205-208) can comprise a lens and an image sensor (i.e. an imager). Throughout this disclosure, the terms image sensor and imager are used interchangeably to refer to any device capable of converting an optical image into electronic signal. For example, the camera can include a digital charge-coupled device (CCD) image sensor, which uses p-doped metal-oxide-semiconductor field-effect transistor (MOSFET) capacitors to represent pixels. These capacitors are biased above the threshold for inversion when image acquisition begins, allowing the conversion of incoming photons into electron charges at the semiconductor-oxide interface. As an alternative example, a camera can include a complementary metal-oxide-semiconductor (CMOS) active pixel sensor that is an integrated circuit containing an array of pixel sensors, each pixel sensor containing a photodetector and an active amplifier.

In one embodiment, the camera (e.g., 202, 203, 205-208) has a format of $\frac{1}{13}'$ with 0.3 million pixels (VGA) or 0.7 million pixels (720p). The lens used with this sensor can have a focal length of approximately 2 mm and be comprised of 2 elements. In some embodiments, due to the large depth of field of such a small format camera, no focus mechanism is required. In addition, due to the ability to make the 2-element lens out of glass, the individual cameras (e.g., 202, 203, 205-208) are solderable.

Figure 3:
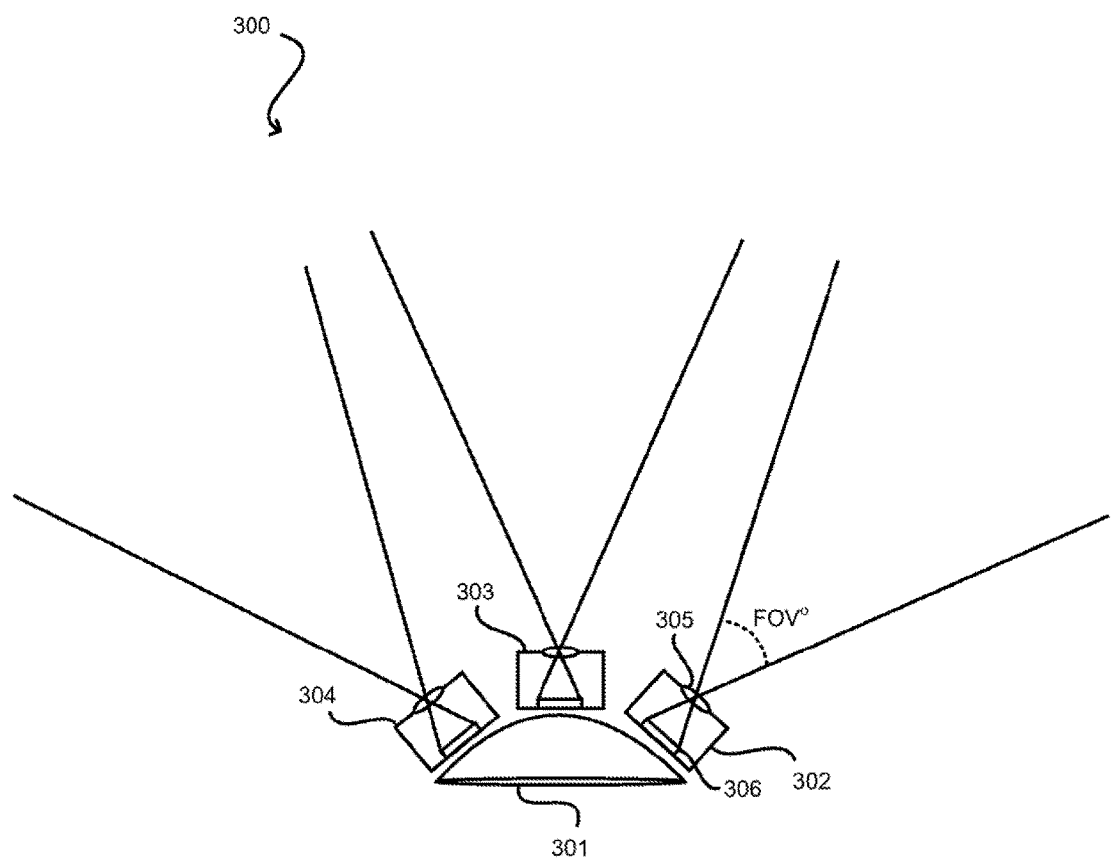
FIG. 3 illustrates an example of the multiple cameras arranged onto a curved surface, such as a spherical dome structure, in accordance with various embodiments.

FIG. 3 illustrates an example 300 of the multiple cameras arranged onto a curved surface, such as a spherical dome structure, in accordance with various embodiments. In the illustrated embodiment, each of the cameras (302, 303, 304) are positioned onto a dome 301. The dome can include a number of segments onto which each camera can be attached. In one embodiment, the normals of the segments (e.g., vectors perpendicular to the planes of the segments) diverge from each other (i.e. are not parallel to each other). This type of dome structure causes the cameras to be tilted in different directions with respect to each other, thereby creating an effect where a portion of the field of view of each camera overlaps and another portion does not overlap.

In some embodiments, the dome can be curved or spherical in shape. In other embodiments, the dome can be piecewise flat for ease of attaching the cameras but with the flat areas lying tangent to a spherical surface. In some embodiments, excess height can be removed from the piecewise flat sections to reduce the overall height of the array. For example, the highest camera 303 in the figure can be brought down by removing excess height from the portion of dome 301 that holds camera 303. This would effectively create a dome structure where camera 303 is at the same height (or lower height) as cameras 304 and 305, thereby creating a thinner overall array.

The three cameras can be a part of a 3×3 array of 9 cameras that is shown from a side view. In this embodiment, the curved surface of the dome 301 causes each of the cameras to be aimed in a different direction from one another. For example, camera 302 is aimed in a different direction from cameras 303 and 304 and so on.

In accordance with an embodiment, each camera includes a lens 305 and an image sensor 306. As used throughout this disclosure, the lens 305 is any optical device capable of transmitting and/or refracting light, converging, or diverging the beam. A simple lens can consist of a single optical element, while a compound lens can be an array of simple lenses (elements) with a common axis. Lenses are typically made of glass or transparent plastic. Any lens can be utilized within the scope of the present disclosure. The image sensor 306 can be any device that converts an optical image into an electronic signal, including but not limited to a charge-coupled device (CCD) image sensor or a complementary metal-oxide-semiconductor (CMOS) sensor. Both types of sensor accomplish the same task of capturing light and converting it into electrical signals.

In accordance with an embodiment, the shape of the dome 301 causes the cameras to be tilted at a predetermined angle in such a way that each camera is facing in a different direction from one another. In some embodiments, the field of view of each camera can overlap slightly with the field of view of adjacent camera(s). For example, the FOV of camera 304 can overlap with the FOV of camera 303, while the FOV of camera 303 can overlap with the FOVs of both cameras 304 and 305.

Figure 4:
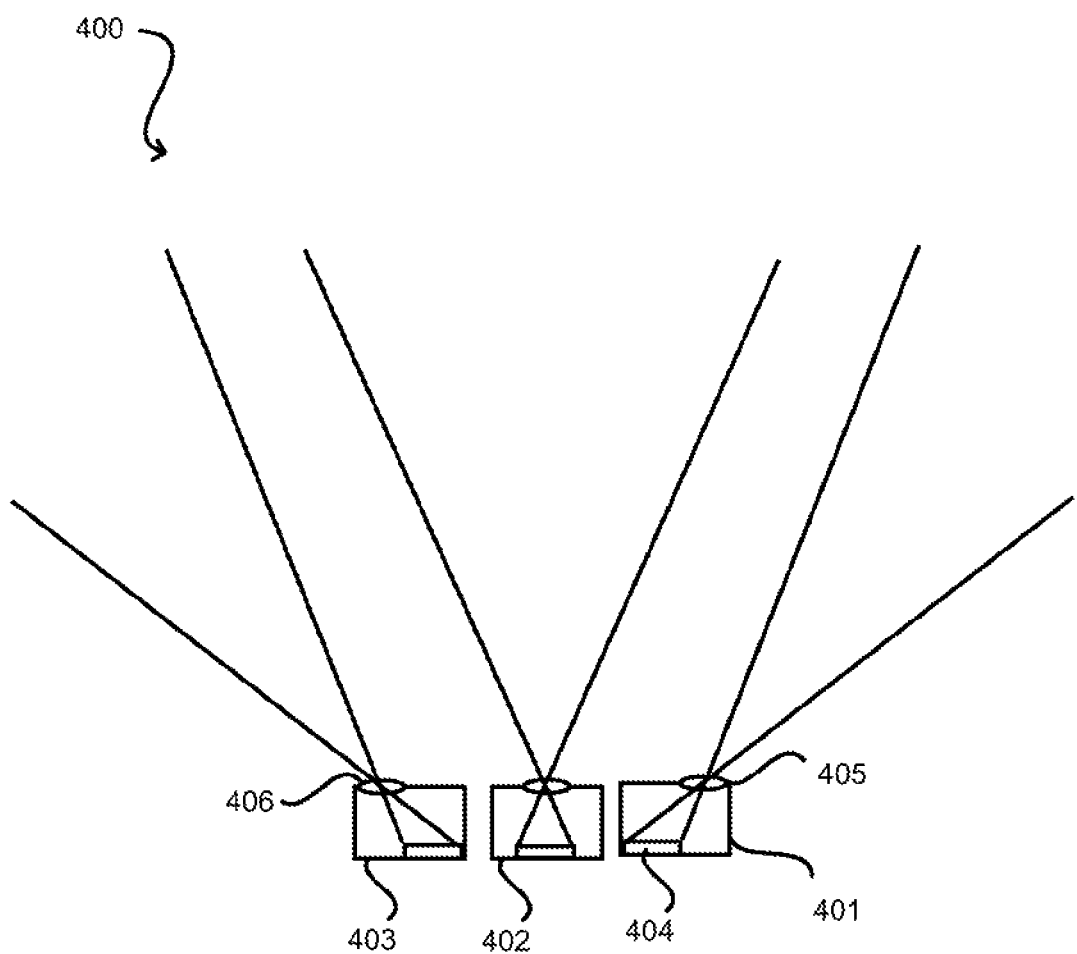
FIG. 4 illustrates an example of laterally translating a lens in front of an imager to cause each camera to be aimed into a different direction, in accordance with various embodiments.

FIG. 4 illustrates an example 400 of laterally translating a lens in front of an imager to cause each camera to be aimed into a different direction, in accordance with various embodiments. In the illustrated embodiment, each of the individual cameras (401, 402, 403) is arranged on a level surface; however the cameras are aimed in different directions by using a lens shift effect that is produced by laterally translating the lens in front of the imaging sensor. For example, the lens 405 is laterally shifted to the right of the imaging sensor 404, thereby causing the camera 401 to be aimed to a different direction than camera 402. Similarly, lens 406 is laterally translated to the left, causing camera 403 to be aimed in a different direction. In some embodiments, the lens covers a larger area than the imager, so that there is still full coverage of the sensor after the shift.

In various embodiments, by aiming the cameras in different directions (using either lens shift or curved surface mounting), a wider field of view can be obtained when the images captured by the cameras are combined into a single image. A camera's angle of view can be measured horizontally, vertically and/or diagonally. Table 1 below illustrates an example of combining two cameras to obtain a wider total field of view.

TABLE 1

|  | D | H | V |
|---|---|---|---|
| Total FOV° | 60 | 48 | 36 |
| No. of cameras | 2 | 2 | 2 |
| FOV nom per cam° | 30 | 24 | 18 |
| + 10% for overlap ° | 33 | 26.4 | 19.8 |

TABLE 1-continued

|  | D | H | V |
|---|---|---|---|
| Total FOV° | 60 | 48 | 36 |
| Incremental tilt per camera ° |  | 24 | 18 |
| Tilt from centerline ° | +/− | 12 | 9 |

Figure 5A:
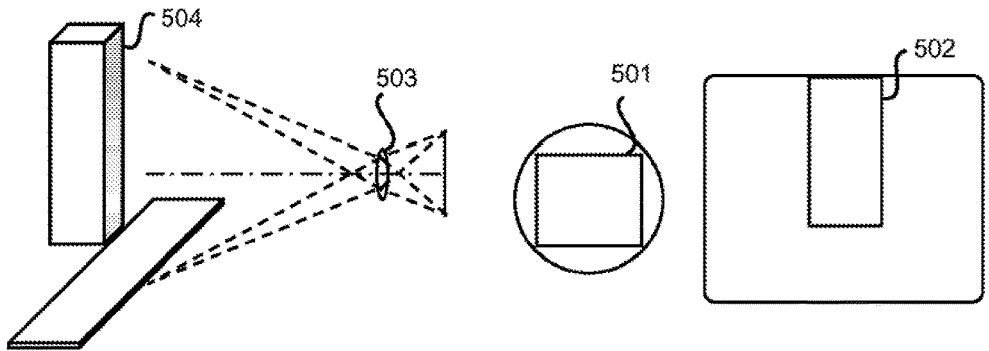
FIG. 5A illustrates an example of a conventional camera with an ordinary lens that is kept level and in front of the imaging sensor, in accordance with various embodiments.
Figure 5B:
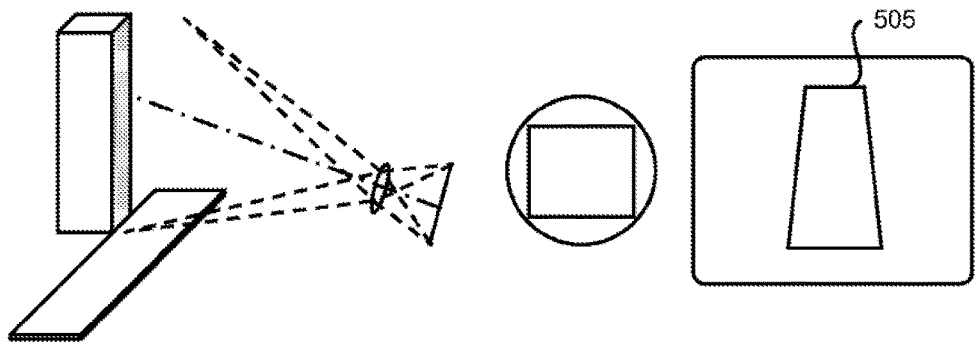
FIG. 5B illustrates an example in which the camera is tilted upwards, thereby resulting in vertical perspective of the object, in accordance with various embodiments.
Figure 5C:
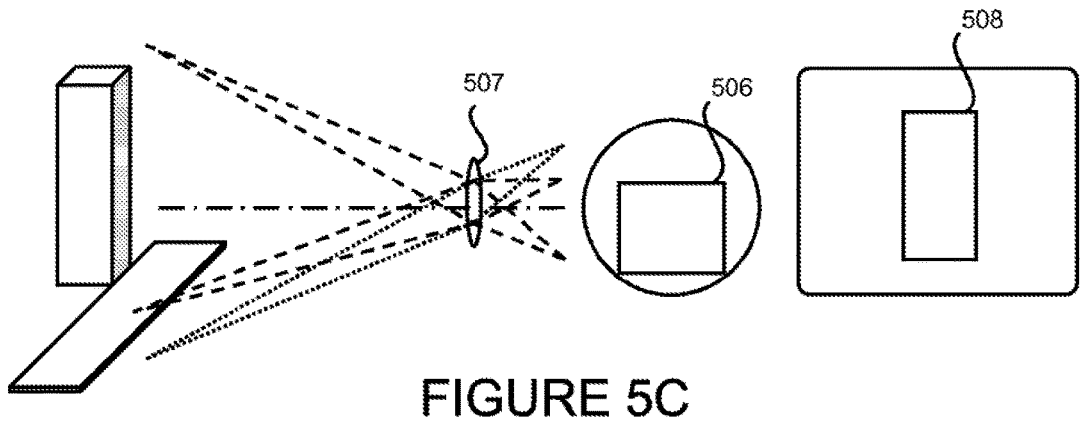
FIG. 5C illustrates an example in which the lens is laterally shifted in front of the imaging sensor, in accordance with various embodiments.

FIGS. 5A, 5B and 5C illustrate several examples of the lens shift effect that can be used in conjunction with various embodiments. For example, FIG. 5A illustrates a conventional camera with an ordinary lens 503 that is kept level and in front of the imaging sensor 501. In this manner, the camera captures only the bottom portion 502 of the entire object 504. FIG. 5B illustrates an example in which the camera is tilted upwards, thereby resulting in vertical perspective of the object 504. By tilting the camera in this manner, the entire object 505 is captured; however, the image introduces some distortion caused by the vertical tilt. This distortion can be corrected by using image correction software. FIG. 5C illustrates an example in which the lens 507 is laterally shifted in front of the imaging sensor 506. This shifting of the lens upwards results in a picture of the entire subject being captured and the captured object 508 does not contain the vertical distortion that is illustrated in FIG. 5B.

Figure 6:
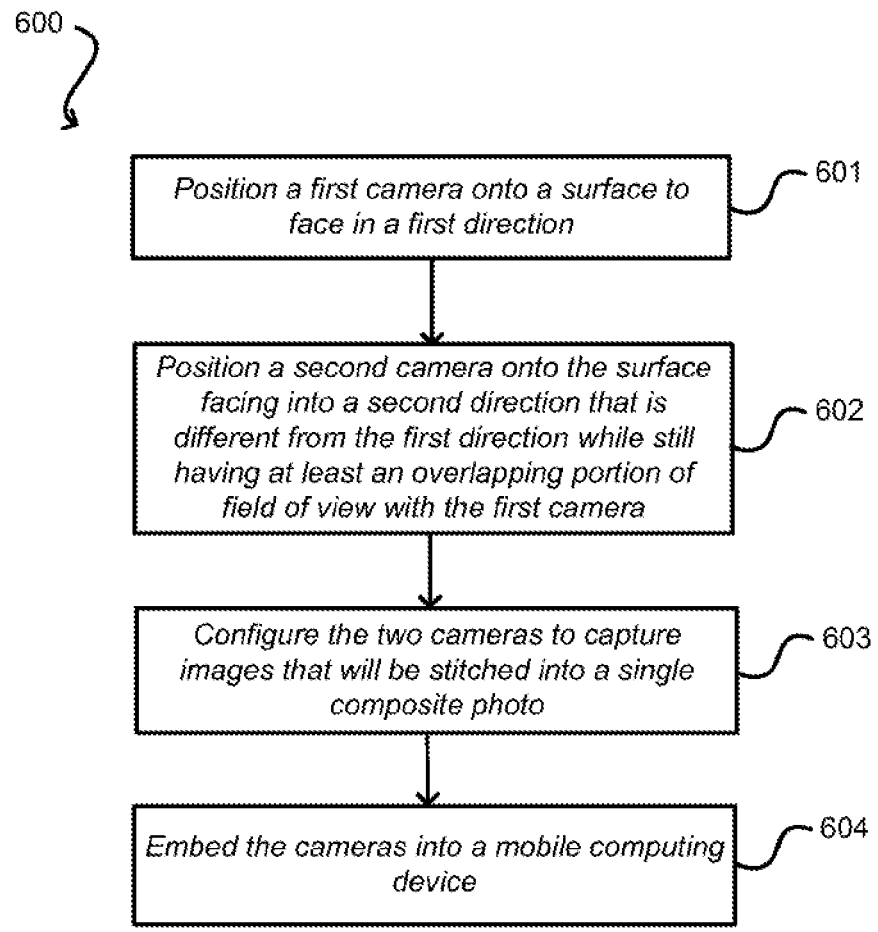
FIG. 6 illustrates an example process that can be used to construct a camera by combining multiple smaller and lower resolution cameras, in accordance with various embodiments.

FIG. 6 illustrates an example process 600 that can be used to construct a camera by combining multiple smaller and lower resolution cameras, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, a first camera is positioned onto a surface. The first camera is faced in a particular direction by either mounting it on a curved surface or by directing the camera using lens shift as previously described.

In operation 502, a second camera is positioned onto the surface. The second camera is aimed in a different direction from the first camera (using either curved surface mounting or lens shift), however, the two cameras have an at least a portion of the field of view that overlaps. For example, 10% of the field of view of both cameras may overlap to ensure that the entire image will be captured by both cameras.

In operation 503, the two cameras are configured to capture images that will be stitched together into a single composite image. The stitching can be performed by software deployed on a mobile computing device.

In operation 504, the first camera and the second camera are embedded into a portable computing device, such as a mobile phone or a tablet computer. In various embodiments, this process can be used to construct an array of multiple cameras (e.g., 2×2, 3×3, 4×4, etc.) that can serve as a single composite high resolution camera (e.g., rear-facing camera of the mobile phone).

Figure 7:
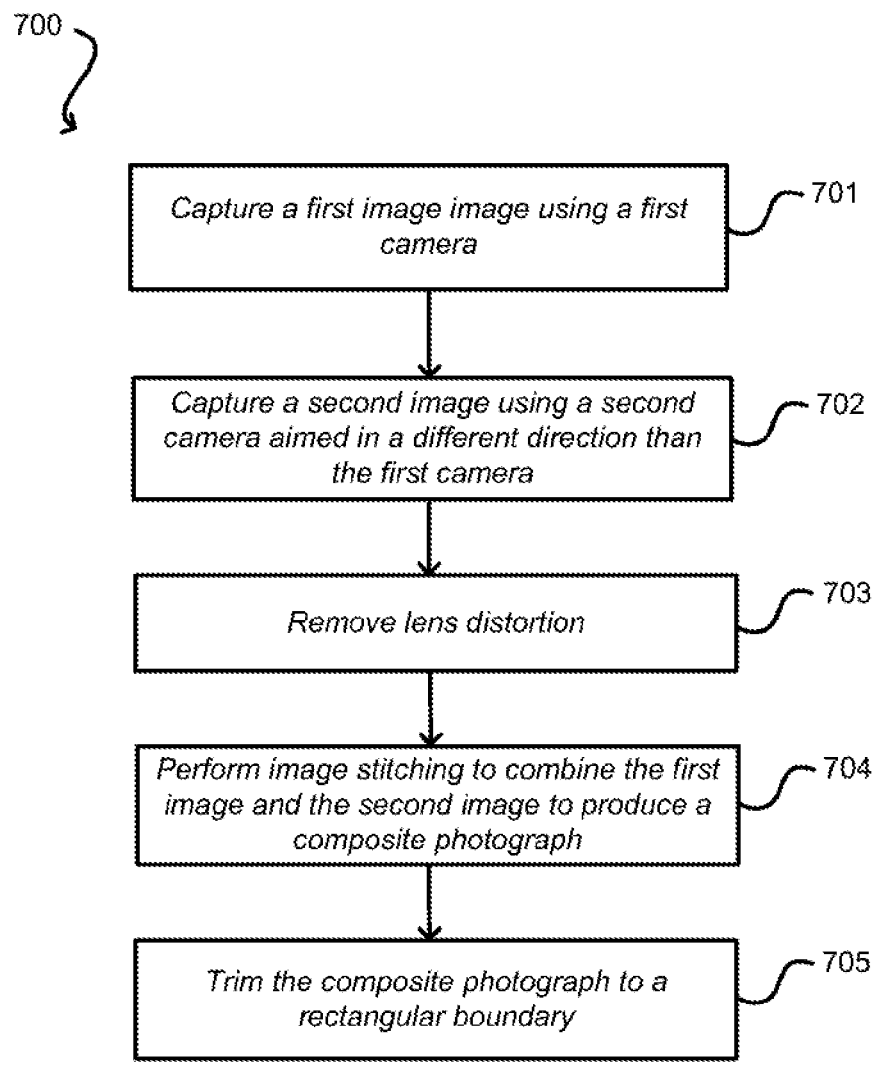
FIG. 7 illustrates an example process that can be used to provide a camera composed of multiple lower resolution cameras, in accordance with various embodiments.

FIG. 7 illustrates an example process 700 that can be used to provide a camera composed of multiple lower resolution cameras, in accordance with various embodiments.

In operation 701, a first camera in the array is used to capture a first image. The camera can be a small, low-resolution camera with a modest field of view (e.g., 25 degrees). In operation 702, a second camera in the array is used to capture a second image. The second camera is faced in a different direction from the first camera while still having a portion of overlapping field of view. In operation 703, lens distortion is removed from the images. For example, the vertical distortion introduced by tilting the camera can be removed using software image correction.

In operation 704, the first image and the second image are stitched together to produce a single composite image. This operation can be performed by using image stitching software executing on the portable computing device. In operation 705, the composite image is trimmed to a simple rectangular boundary. The composite image can then be stored in the memory of the mobile device, be displayed to the user and so on.

Figure 8:
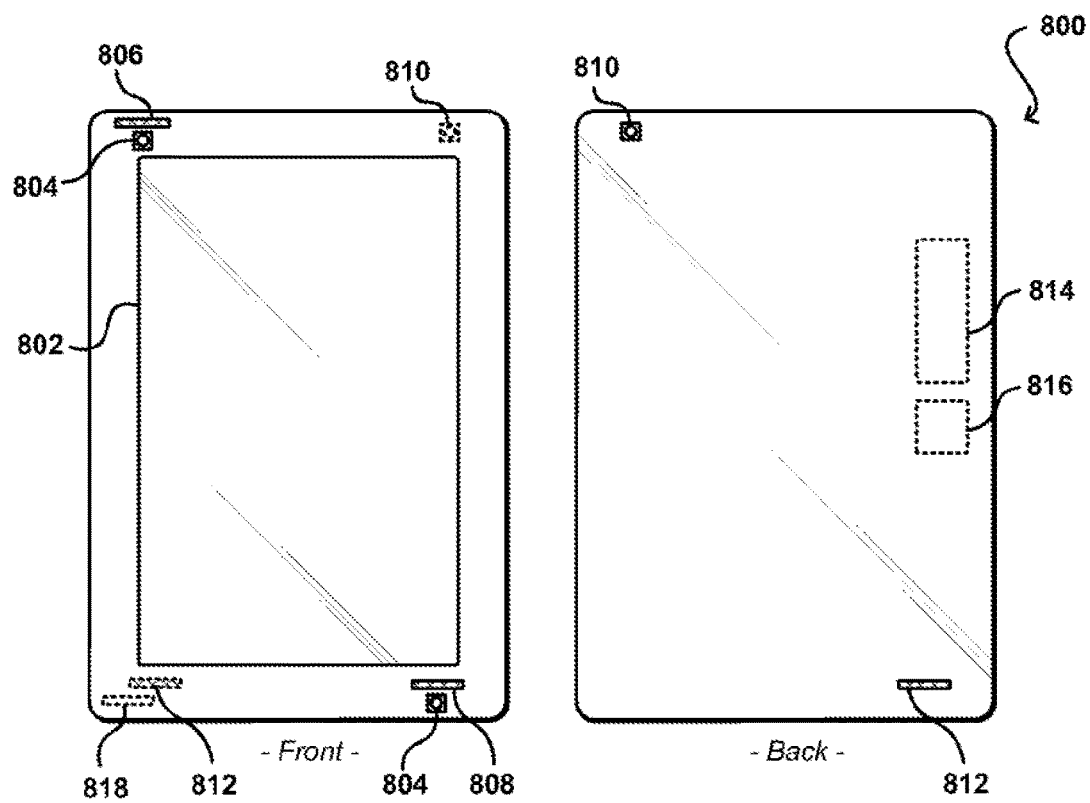
FIG. 8 illustrates front and back views of an example portable computing device that can be used in accordance with various embodiments.

FIG. 8 illustrates front and back views of an example portable computing device 800 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 800 has a display screen 802 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material or element 818 on other areas of the device as well, such as on the sides or back of the device. While in at least some embodiments a user can provide input by touching or squeezing such a material, in other embodiments the material can be used to detect motion, such as of the device or a user's finger movement of an object with respect to the material, and the like. Further, in some embodiments the material will be used to provide specific inputs or commands.

The example portable computing device can include one or more image capturing components for purposes such as conventional image and/or video capture. As discussed elsewhere herein, the image capturing components can also be used for purposes such as to determine motion and receive gesture input. While the portable computing device in this example includes two image capturing components 804 on the "front" of the device and one image capturing component 810 on the "back" of the device, it should be understood that image capturing components could also, or alternatively, be placed on the sides or corners of the device, and that there can be any appropriate number of image capturing component of similar or different types. Each image capturing component may be, for example, a camera, a charge-coupled device (CCD), a motion detection sensor, or an infrared sensor, or can utilize another image capturing technology.

The portable computing device can also include at least one microphone 806 or other audio capture element(s) 808 and 812 capable of capturing audio data, such as may be used to determine changes in position or receive user input in certain embodiments. In some devices there may be only one microphone, while in other devices there might be at least one microphone on each side and/or corner of the device, or in other appropriate locations.

The device 800 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 814, such as may include at least one wired or wireless component operable to communicate with one or more portable computing devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
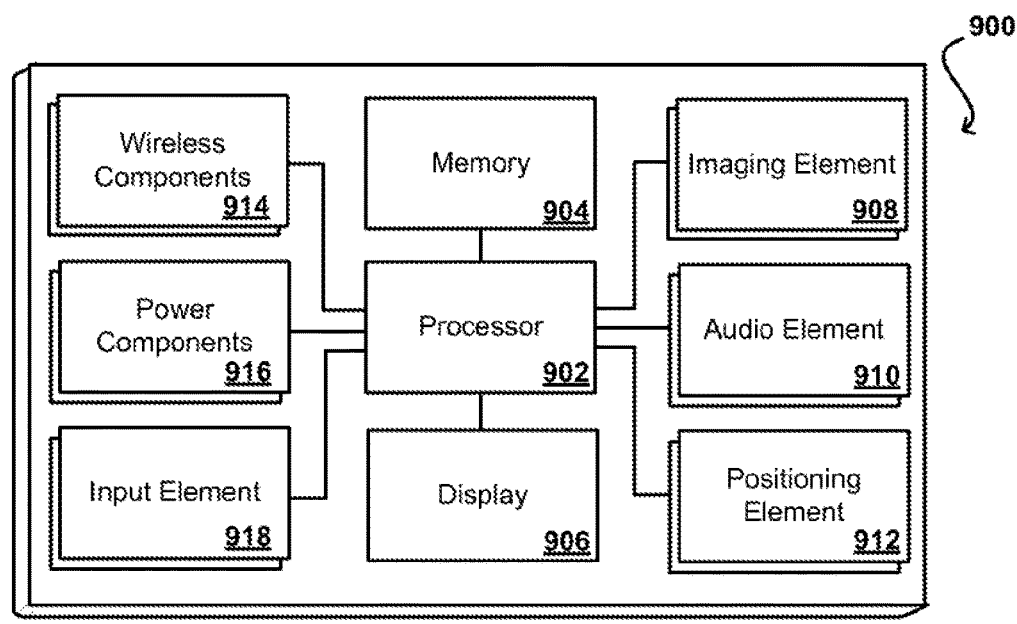
FIG. 9 illustrates an example set of basic components of a portable computing device, such as the device described with respect to FIG. 8.

In order to provide functionality such as that described with respect to FIG. 8, FIG. 9 illustrates an example set of basic components of a portable computing device 900, such as the device 800 described with respect to FIG. 8. In this example, the device includes at least one processor 902 for executing instructions that can be stored in at least one memory device or element 904. As would be apparent to one of ordinary skill in the art, the device can include many types of memory, data storage or computer-readable storage media, such as a first data storage for program instructions for execution by the processor 902, the same or separate storage can be used for images or data, a removable storage memory can be available for sharing information with other devices, etc.

The device typically will include some type of display element 906, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 908, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 910, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 912 that provides information such as a position, direction, motion, or orientation of the device. This positioning element 912 can include, for example, accelerometers, inertial sensors, electronic gyroscopes, electronic compasses, and GPS elements.

The device can include at least one additional input device 918 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 914 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 916 known in the art for providing power to a portable computing device, which can include capacitive charging elements for use with a power pad or similar device as discussed elsewhere herein.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
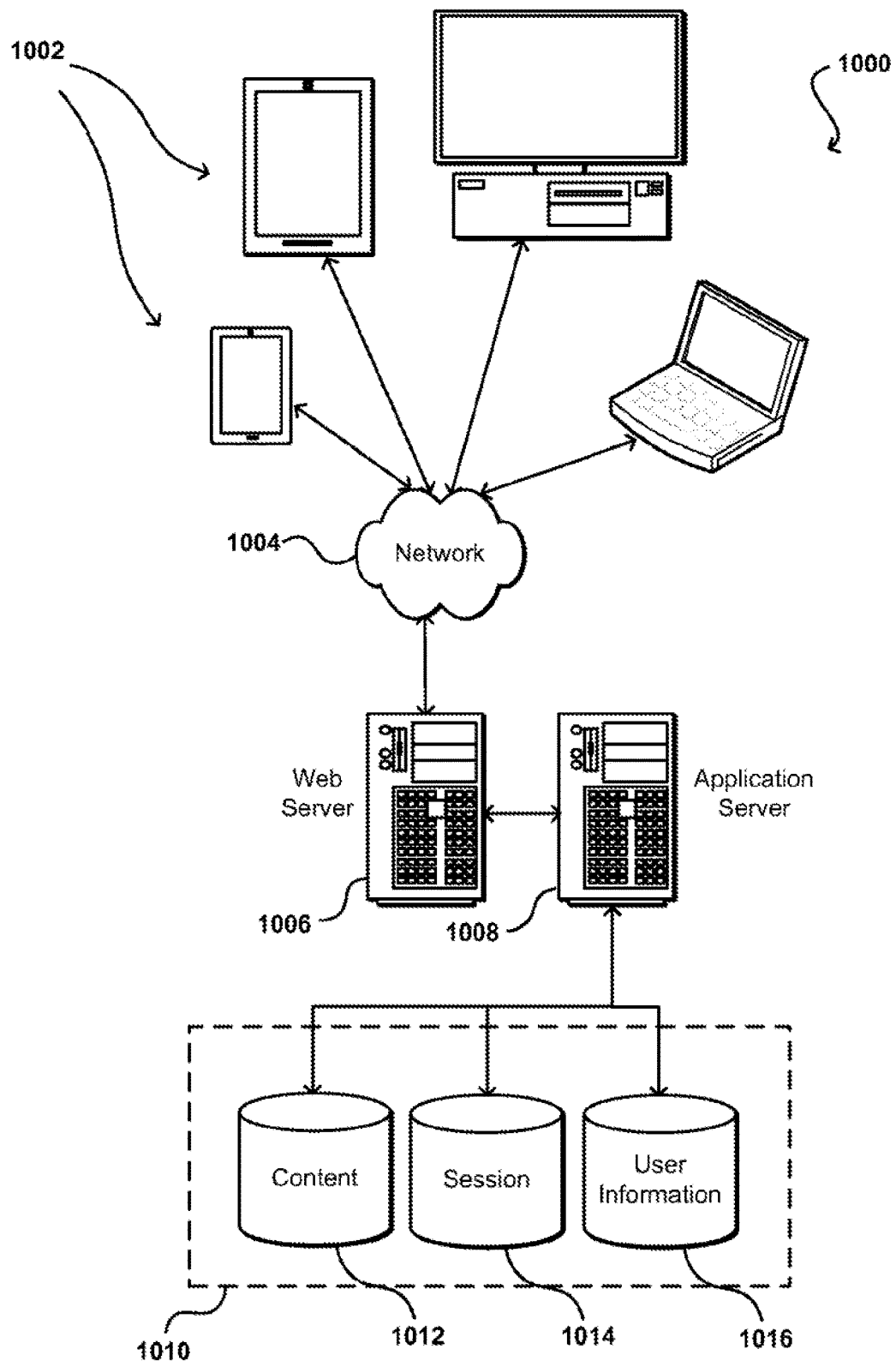
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the client device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A device, comprising:
a housing that defines at least one radius;
a plurality of cameras positioned with respect to the housing, the plurality of cameras includes a first camera associated with a first field of view and a second camera associated with a second field of view that overlaps at least a portion of the first field of view;
at least one processor; and
memory to store instructions and image data captured by the plurality of cameras, the image data having a first resolution, wherein the instructions, when executed by the at least one processor, cause the at least one processor to:
   generate composite image data based on the image data captured by the plurality of cameras, the composite image data having a second resolution that is a higher resolution than the first resolution.

2. The device of claim 1, wherein the first camera is aimed in a different direction with respect to the second camera to cause a first optical axis associated with the first camera to diverge from a second optical axis associated with the second camera by an angle.

3. The device of claim 1, wherein each camera of the plurality of cameras is aimed in a different direction with respect to one or more adjacent cameras.

4. The device of claim 1, wherein each camera of the plurality of cameras is positioned tangent to the at least one radius.

5. The device of claim 1, wherein the composite image data represents a field of view larger than at least one of the first field of view or the second field of view.

6. The device of claim 1, wherein the instructions, when executed by the processor further cause the processor to:
   generate first image data and second image data from the image data captured by the plurality of cameras based on an image correction algorithm; and
   generate the composite image data based on the first image data and the second image data, the composite image data represents at least a portion of the first image data and the second image data.

7. The device of claim 6, wherein the instructions, when executed by the processor, further cause the processor to:
   discard at least one of a portion of the first image data or a portion of the second image data based on at least one of a predetermined shape or a predetermined size.

8. A device, comprising:
   a first camera associated with a first optical axis and a first field of view, the first camera is configured to capture first image data having a first resolution;
   a second camera associated with a second optical axis and a second field of view that overlaps at least a portion of the first field of view, the second optical axis diverges from the first optical axis by an angle based on at least one radius associated with a housing, the second camera is configured to capture second image data having the first resolution; and
   a processor configured to generate composite image data having a second resolution that is a higher resolution than the first resolution, the composite image data includes at least a portion of the first image data and the second image data, wherein the composite image data represents a field of view larger than one or more of the first field of view or the second field of view.

9. The device of claim 8, wherein the housing defines the at least one radius for positioning the first camera and the second camera.

10. The device of claim 9, wherein the first camera is positioned tangent to the at least one radius and the second camera is positioned tangent to the at least one radius.

11. The device of claim 8, wherein the processor is further configured to generate the composite image data based on an image correction algorithm.

12. The device of claim 8, wherein the processor is further configured to:
   discard at least one of a portion of the first image data or a portion of the second image data based on at least one of a predetermined shape or a predetermined size.

13. A method, comprising:
   capturing first image data having a first resolution by a first camera associated with a first field of view, the first camera is positioned with respect to a housing that defines at least one radius;
   capturing second image data having the first resolution by a second camera associated with a second field of view that overlaps at least a portion of the first field of view, the second camera is positioned with respect to the housing and is aimed in a different direction relative to the first camera; and
   generating composite image data having a second resolution that is a higher resolution than the first resolution, the composite image data based on the first image data and the second image data, the composite image data represents at least a portion of the first image data and the second image data.

14. The method of claim 13, further comprising:
   positioning the first camera with respect to the at least one radius so that a first optical axis associated with the first camera diverges by an angle from a second optical axis associated with the second camera.

15. The method of claim 13, further comprising:
   positioning the first camera tangent to the at least one radius; and
   positioning the second camera tangent to the at least one radius.

16. The method of claim 13, wherein the composite image data represents a field of view larger than at least one of the first field of view or the second field of view.

17. The method of claim 13, further comprising:
   applying an image correction algorithm to at least one of the first image data or the second image data to generate corrected image data, and
   wherein generating the composite image data further comprises generating the composite image data based on the corrected image data.

18. The method of claim 13, wherein generating the composite image data further comprises:
   discarding at least one of a portion of the first image data or a portion of the second image data based on at least one of a predetermined shape or a predetermined size.

19. The method of claim 13, further comprising:
   providing an offset between a lens and an imager of the first camera so that a first optical axis associated with the first camera diverges by an angle from a second optical axis associated with the second camera.

* * * * *